Figure 1:
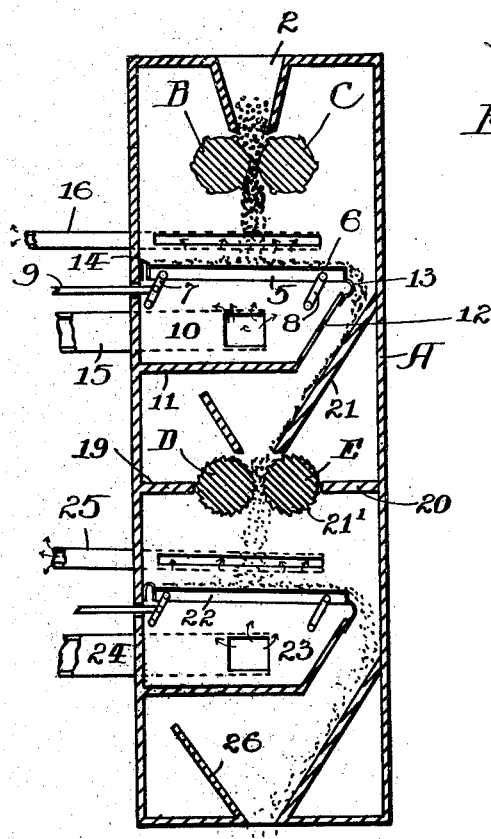

No. 736,346. PATENTED AUG. 18, 1903.
W. E. BAKER.
PROCESS OF TREATING COFFEE.
APPLICATION FILED APR. 3, 1903.
NO MODEL.

Witnesses:
Inventor:
William E. Baker,
by: Stryker & Bradbury
Attorneys.

No. 736,346. Patented August 18, 1903.

UNITED STATES PATENT OFFICE.

WILLIAM E. BAKER, OF MINNEAPOLIS, MINNESOTA.

PROCESS OF TREATING COFFEE.

SPECIFICATION forming part of Letters Patent No. 736,346, dated August 18, 1903.

Application filed April 3, 1903. Serial No. 150,890. (No specimens.)

*To all whom it may concern:*

Be it known that I, WILLIAM E. BAKER, a citizen of the United States of America, and a resident of Minneapolis, in the county of Hennepin and State of Minnesota, have invented certain new and useful Improvements in Processes of Treating Coffee, of which the following is a specification.

My invention is designed for the production of an improved article of manufacture consisting of finely-cut roasted coffee having granules of uniform size and having the dust, chaff, and other impurities, including a portion of the tannic acid, removed therefrom; and the invention resides in a novel process of treating the coffee and in the improved product obtained as a result thereof.

This invention is an improvement on the subject-matter described in my Patent No. 726,812, dated April 28, 1903, for an improvement in processes of treating coffee. In the patent referred to the product is the result of crushing the coffee by means of smooth-surfaced flattening-rolls which free the silver skins and of separating said skins from the broken bodies of the beans.

In the present invention the improved coffee is a graded and highly-purified product of sharply-dressed mechanism, the action of which is to cut rather than to crush or grind, which leaves the particles in a condition analogous to that of sharps or middlings of grain—viz., uncompressed, and therefore more readily permeable to hot water. I have found that roasting renders the body proper of the coffee-bean exceedingly brittle, while the embedded silver skins remain relatively flexible. These conditions facilitate the subsequent purification of the cut coffee. As a result of my improved process the final product is superior in many respects to ordinary ground or granulated coffee—that is to say, it presents a much better appearance, in that the angular particles are of regular size and do not disclose the presence of dust or flakes of silver skins therein. As these silver skins in the interior of the bean contain a large percentage of tannic acid, an important deleterious matter has been removed and the flavor and aroma of the resulting product are radically improved. Furthermore, by cutting instead of crushing I obtain a product which will more quickly and with less waste of the granulated coffee produce a strong and aromatic beverage.

It is the purpose of my invention to produce a clean regularly-cut product which is uncompressed or only slightly compressed, and therefore quick to absorb water.

One form of apparatus by which my invention can be carried out is illustrated in the accompanying drawings, in which—

Figure 2:
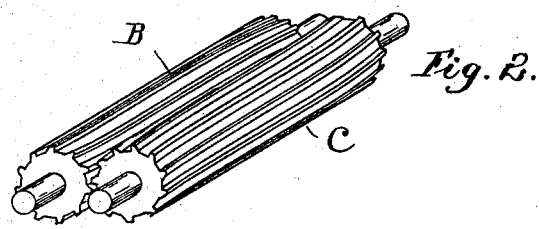

Figure 1 is a sectional elevation, and Fig. 2 is a perspective view, of a pair of the cutting-rolls.

This apparatus consists of a casing A, having a chute 2 at its upper end and a pair of sharply-dressed or cutting rolls B and C below said chute. The coffee-beans after being roasted in the ordinary manner, whereby the body of the bean is rendered brittle, while the embedded silver skin remains relatively flexible, is fed through said chute between said rolls. These rolls are revolved by any suitable means (not shown) in the direction indicated by the arrows and at different surface speeds and cut the coffee-beans into coarse granules, thus freeing the silver skins. Beneath the cutting-rolls B and C is located a reciprocating or shaking screen 5, the same consisting of a frame having a covering 6, of bolting-cloth, wire-netting, or other reticulated material. The frame of the screen 5 is pivoted at its opposite ends to links 7 and 8, which are themselves pivoted to the frame of the casing A at their lower ends. These links constitute supports for the screen 5, and the latter is adapted to be reciprocated by means of a pitman-rod 9, connected with the link 7 and operated in any suitable manner. Beneath the screen 5 is a closed chamber 10, formed by a bottom piece 11 and end piece 12, and flexible webs 13 and 14, connected, respectively, with the frame of the screen 5 at opposite ends and with the end piece 12 and side wall of the casing A. Into the chamber 10 leads an air-inlet pipe 15, through which a blast of air is adapted to be forced, and from the casing A, above the screen 5, leads an exhaust-pipe 16. The screen 5 is slightly inclined below the cutting-rolls, so that the particles of coffee when delivered thereon may be caused to pass from one end thereof, as clearly shown in the drawings. On this screen, which is constantly being shaken or agitated by the means described, the cut coffee is subjected to a blast of air entering the chamber 10 beneath the screen 5 through the pipe 15 and discharging through the exhaust-pipe 16. This current or blast of air carries off with it the light particles of matter contained in the coffee, consisting of the dust and the chaff, which latter is produced by the silver skin from the inside of the coffee-bean. As the operation continues the particles of coffee are discharged from the delivery end of the screen 5 into the chute or hopper 21 and are then caused to pass between a second pair of sharply-dressed or cutting rolls D and E, which have a larger number of cutting edges 21' than the first pair. In other respects the second pair of rolls is similar in construction and operation to the first pair of rolls B and C. By the latter rolls the coffee is reduced to a more finely cut condition, and from the same it is delivered onto the shaking-screen 22, which is similar in all respects to the screen 5 heretofore referred to. The screen 22 has beneath it a chamber 23, similar to the chamber 10 and connected with the screen 22 in a similar manner to that above described.

Leading into the chamber 23 is an air-inlet pipe 24, and leading from the casing A, above the screen 22, is an exhaust-pipe 25. On the screen 22 the coffee is subjected to the action of a second blast of air, which enters the chamber 23 beneath said screen through the pipe 24 and discharges from the point above the screen through the exhaust-pipe 25. Any chaff, dust, or other light finely-divided impurities which escape the action of the blast of air passing through the screen 5 are removed by the blast of air to which the coffee is subjected on the screen 22. The screen 22 is inclined and discharges the coffee therefrom into the chute or hopper 26, whence it may be delivered from the machine to any suitable point. The rolls D and E are located near the parts 19 and 20 of a transverse diaphragm, which prevents the passage of the air-current from the inlet-pipe 24 through the exhaust-pipe 16. Of course, if desired, the product delivered from the machine through the discharge-chute may be further cut.

I have shown and described two sets of cutting-rolls and means for subjecting the cut coffee to the action of a blast of air; but it is obvious that I may increase or decrease the number of these sets of instrumentalities as may be found necessary or expedient.

Having described my invention, what I claim as new, and desire to protect by Letters Patent, is—

1. The process of preparing coffee for use, which consists in removing the outer skin, roasting the coffee, whereby the berry is rendered brittle, while the embedded silver skins remain flexible, cutting the roasted berry, and releasing the skins, and finally separating the skins from the cut granules by means of an air-current.

2. The process for treating coffee, which consists essentially in first roasting the coffee-bean, whereby the body of the bean is rendered brittle, while the embedded silver skin remains relatively flexible, then cutting the roasted bean into relatively uncompressed and uniform granules and freeing the silver skins, and finally separating said skins from the cut body of the bean.

3. As a new article of manufacture, the roasted body of the coffee-bean, cut into granules and freed from the embedded silver skins.

In testimony whereof I have signed my name to this specification in the presence of two subscribing witnesses.

WILLIAM E. BAKER.

Witnesses:
   E. M. BOESEL,
   F. G. BRADBURY.